(12) United States Patent
Flanigan

(10) Patent No.: US 8,084,521 B2
(45) Date of Patent: Dec. 27, 2011

(54) SYSTEM AND METHOD FOR THE PRE-TREATMENT OF RUBBER-MODIFIED ASPHALT CEMENT, AND EMULSIONS THEREOF

(75) Inventor: Theodore P. Flanigan, League City, TX (US)

(73) Assignee: Wright Advanced Asphalt Systems, Houston, TX (US)

( * ) Notice: Subject to any disclaimer, the term of this patent is extended or adjusted under 35 U.S.C. 154(b) by 233 days.

(21) Appl. No.: 12/453,070

(22) Filed: Apr. 28, 2009

(65) Prior Publication Data
US 2009/0275679 A1 Nov. 5, 2009

Related U.S. Application Data

(60) Provisional application No. 61/071,473, filed on Apr. 30, 2008.

(51) Int. Cl.
*C08K 3/00* (2006.01)
*C08J 3/00* (2006.01)
*C08L 95/00* (2006.01)

(52) U.S. Cl. .................. 524/2; 524/59; 524/60; 524/64; 524/71

(58) Field of Classification Search ................ 524/2, 59, 524/60, 64, 71
See application file for complete search history.

(56) References Cited

U.S. PATENT DOCUMENTS

| | | | | |
|---|---|---|---|---|
| 3,271,307 | A * | 9/1966 | Dickson et al. | 166/280.1 |
| 4,523,957 | A | 6/1985 | Graf et al. | |
| 4,985,079 | A | 1/1991 | Graf et al. | |
| 5,503,871 | A * | 4/1996 | Blacklidge et al. | 427/138 |
| 6,143,812 | A | 11/2000 | Martin et al. | |
| 6,786,963 | B2 * | 9/2004 | Matherly et al. | 106/281.1 |
| 6,894,092 | B2 * | 5/2005 | Sylvester | 524/59 |
| 7,025,822 | B2 * | 4/2006 | Partanen et al. | 106/284.01 |
| 7,074,846 | B2 | 7/2006 | Sylvester et al. | |
| 7,087,665 | B2 | 8/2006 | Sylvester et al. | |

OTHER PUBLICATIONS

International Search Report dated Jun. 23, 2009 for corresponding International Application PCT/US2009/002581.

* cited by examiner

Primary Examiner — Michael M Bernshteyn
(74) Attorney, Agent, or Firm — Jones Day

(57) ABSTRACT

This invention encompasses asphalt cement emulsions, as well as methods for preparing a pre-treated rubber-modified asphalt cement emulsions and methods for coating industrial surfaces using asphalt cement emulsions.

17 Claims, No Drawings

US 8,084,521 B2

SYSTEM AND METHOD FOR THE PRE-TREATMENT OF RUBBER-MODIFIED ASPHALT CEMENT, AND EMULSIONS THEREOF

CROSS REFERENCE TO RELATED APPLICATION

This application claims the benefit of priority from U.S. Provisional Application No. 61/071,473, filed Apr. 30, 2008. The application, in its entirety, is incorporated herein by reference.

FIELD OF THE INVENTION

This invention relates to an asphalt cement emulsion, and more specifically relates to a pre-treated rubber-modified asphalt cement emulsion.

BACKGROUND OF THE INVENTION

Several attempts have been made to produce rubber-modified asphalt emulsions having the highly desirable properties of stability and prolonged high-level resistance to water-, fuel-, and ultraviolet (UV) light-associated degradation.

Specifically, for example, U.S. Pat. No. 5,492,561 (Flanigan) and U.S. Pat. No. 5,583,168 (Flanigan) describe processes for liquefying tire rubber in a TRMACS process, by heating crumb rubber and asphalt to temperatures of approximately 500° F. U.S. Pat. No. 5,539,029 (Burress) describes a method for preparing an asphalt emulsion comprising mixing aggregate with an aqueous emulsion comprising water, asphalt, a thickening agent, latex rubber, and rubber particles. U.S. Pat. No. 7,087,665 (Sylvester), U.S. Pat. App. No. 2005/0131113, filed Feb. 7, 2005 (Sylvester), and U.S. Pat. App. No. 2007/0049762, filed Jul. 10, 2006 (Sylvester) describe methods for preparing asphalt emulsions comprising mixing a rubber-modified asphalt cement with aqueous solutions comprising an emulsifier.

Although several achievements have been made in producing asphalt emulsions having desirable properties, a need still remain for improved rubber-modified asphalt cement emulsions that possess superior stability and shielding properties.

The present invention provides such an improved emulsion, as well as methods for preparing and using such an emulsion.

BRIEF SUMMARY OF THE INVENTION

In one aspect, the present invention relates to a method for preparing an asphalt cement emulsion, comprising: preparing a pre-treatment mixture comprising a rubber-modified asphalt cement; and contacting the pre-treatment mixture with water and clay.

In another aspect, the present invention relates to a method for preparing an asphalt cement emulsion, comprising: preparing a pre-treatment mixture consisting of a rubber-modified asphalt cement, one or more emulsifiers, and an optional anti-foam agent, polymer latex, sulfonic acid, and/or water; and contacting the pre-treatment mixture with water.

In another aspect, the present invention relates to a method for preparing an asphalt cement emulsion, comprising contacting a pre-treated rubber-modified asphalt cement with water and clay.

In another aspect, the present invention relates to a method for preparing an asphalt cement emulsion, comprising contacting a rubber-modified asphalt cement with an emulsifier comprising a diamine compound and water.

In another aspect, the present invention relates to a method for pre-treating a rubber-modified asphalt cement, comprising contacting a rubber-modified asphalt cement with an emulsifier comprising a diamine compound.

In another aspect, the present invention relates to an asphalt cement emulsion comprising: a pre-treatment mixture consisting of a rubber-modified asphalt cement, one or more emulsifiers, and an optional anti-foam agent, polymer latex, sulfonic acid, and/or water; and water.

In another aspect, the present invention relates to an asphalt cement emulsion comprising: a rubber-modified asphalt cement; water; and a clay.

In another aspect, the present invention relates to an asphalt cement emulsion comprising: a rubber-modified asphalt cement; an emulsifier comprising a diamine compound; and water.

In another aspect, the present invention relates to a readily-emulsifiable rubber-modified asphalt cement composition, comprising: rubber; asphalt cement; and an emulsifier comprising a diamine compound.

In another aspect, the present invention relates to a readily-emulsifiable rubber-modified asphalt cement composition, prepared by contacting the rubber-modified asphalt cement with an emulsifier comprising a diamine compound.

Several embodiments of the invention, including the above aspects of the invention, are described in further detail as follows. Generally, each of these embodiments can be used in various and specific combinations, and with other aspects and embodiments unless otherwise stated herein.

DETAILED DESCRIPTION OF THE INVENTION

The following detailed description, and the accompanying drawings to which it refers, are provided describing and illustrating certain examples or specific embodiments of the invention only and not for the purpose of exhaustively describing all possible embodiments and examples of the invention. Thus, this detailed description does not in any way limit the scope of the inventions claimed in this patent application or in any patent(s) issuing form this or any related application.

To facilitate the understanding of the subject matter disclosed herein, a number of terms, abbreviations or other shorthand as used herein are defined below. Any term, abbreviation or shorthand not defined is understood to have the ordinary meaning used by a skilled artisan contemporaneous with the submission of this application.

The term "rubber-modified asphalt cement" (RMAC) is defined herein to mean any asphalt cement that contains rubber or to which rubber has been added, such as the rubber-modified asphalt cement that is commercially available as tire rubber modified asphalt cement (TRMAC) from Wright Asphalt Products Co. (Houston, Tex.).

The term "asphalt cement" is used herein to mean any suitable naturally-occurring asphalt or asphalt cement, synthetically manufactured asphalt or asphalt cement, such as any asphalt that is a by-product of a petroleum refining process, blown asphalt, blended asphalt, residual asphalt, aged asphalt, petroleum asphalt, straight-run asphalt, thermal asphalt, paving grade-asphalt, performance graded asphalt cement, asphalt flux, bitumen, or the like. Suitable performance graded asphalt cements include, for example, any asphalt cements having the following characteristics set forth in ASTM D6373-99, the contents of which are incorporated herein by reference:

|  | PG64-22<br>Asphalt Cement | PG58-28<br>Asphalt Cement |
|---|---|---|
| Average 7-day max<br>Pavement Design Temp, ° C. | <58 | <64 |
| Min. Pavement Design Temp, ° C. | >−28 | >−22 |
| Original Binder | | |
| Flash Point Temp., D 92; min ° C. | 230 | 230 |
| Viscosity, D4402:<br>max. 3Pa · s<br>Test Temp., ° C. | 135 | 135 |
| Dynamic Shear, P 246:<br>G°/sinδ, min. 1.00 kPa<br>25 mm Plate, 1 mm Gap<br>Test Temp. at 10 rad/s, ° C. | 58 | 64 |
| Rolling Thin Film Over (Test Method D 2872) | | |
| Mass Loss, max. percent | 1.00 | 1.00 |
| Dynamic Shear, P 246:<br>G°/sinδ, min. 2.20 kPa<br>25 mm Plate, 1 mm Gap<br>Test Temp. at 10 rad/s, ° C. | 58 | 64 |
| Pressure Aging Vessel Residue (AASHTO PP1) | | |
| PAV Aging Temperature, ° C. | 100 | 100 |
| Dynamic Shear, P 246:<br>G°/sinδ, min. 5000 kPa<br>8 mm Plate, 2 mm Gap<br>Test Temp. at 10 rad/s, ° C. | 19 | 25 |
| Creep Stiffness, P 245:<br>S, max 300 MPa,<br>m-value; min. 0.300<br>Test Temp at 60 s, ° C. | −18 | −12 |
| Direct Tension, P 252:<br>Failure Strain, min. 1.0%<br>Test Temp. at 1.0 mm/min, ° C. | −18 | −12 |

Suitable asphalt cements also include, for example, any asphalts having the following characteristics:

|  | AC-20 | AC-5 | Asphalt cement flux | ASTM # |
|---|---|---|---|---|
| Orig. visc. at 140° F. in poise | 1725 | 568 | 40 | ASTM D2171 |
| Penetration at 77° F. 100 g. 5 sec. dmm | 57 | 153 | 300+ | ASTM D5 |
| Softening point ° F. | 118 | 104 | 65 | ASTM D36 |
| Flash point ° F. (COC) | 585 | 588 | 565 | ASTM D92 |
| Ductility at 39.2° F. 5 cm/min. cm | 0 | 5.5 | 15 | ASTM D113 |

The term "rubber" is used herein to mean any material made substantially of rubber, such as, for example, virgin rubber, recycled rubber (such as from tires, inner-tubes, gaskets, rubber scrap, or the like), peel rubber, cured rubber, and/or processed rubber of any polymer type(s), such as, for example, tire rubber (e.g., scrap tire rubber, whole tire solid rubber, and/or scrap whole tire rubber), non-solvent-treated rubber, non-pre-swelled rubber, and/or any rubber that comprises less than about 5% (such as less than about 3% or even 1%) of talc powder, such as wherein the rubber has no insoluble materials such as metals, fibers, cords, wood, rocks, dirt, and/or the like. The rubber can exist in any form, such as in the form of particles, crumbs, and/or other particulate forms (e.g., shavings, fines, beads, or the like), which can be produced and/or processed in any manner (such as via vulcanization, ambient grinding and/or cryogenic grinding). Moreover, the rubber particles can be of any suitable size prior to formation of the RMAC, such that, for example, greater than about 90 wt. % (such as greater than about 95 wt. %, or even greater than about 99%) of the rubber particles, relative to the total weight of the rubber particles, have a size of less than about 20 mesh (such as less than about 30 mesh, about 40 mesh, about 50 mesh, about 60 mesh, or even less than about 70 mesh).

Preparation of Rubber-Modified Asphalt Cement

The rubber-modified asphalt cement (RMAC) can be prepared in any suitable manner, such as by combining, mixing, contacting, and/or blending rubber with asphalt cement under heat (e.g., at a temperature greater than about 350° F., greater than about 400° F., or greater than about 450° F., such as a temperature of about 350-525° F., about 400-500° F.), pressure and/or other conditions that are suitable to cause at least some (e.g., a substantial amount) of the rubber to be liquefied or otherwise subsumed, incorporated, and/or integrated into the asphalt cement. For example, the RMAC can be prepared using any process and/or method described in U.S. Pat. No. 5,492,561 (Flanigan), U.S. Pat. No. 5,583,168 (Flanigan), U.S. Pat. No. 5,496,400 (Doyle), U.S. Pat. No. 7,087,665 (Sylvester), U.S. Pat. App. No. 2005/0131113, filed Feb. 7, 2005 (Sylvester), and/or U.S. Pat. App. No. 2007/2049762, filed Jul. 10, 2006 (Sylvester), the contents of which are incorporated herein in their entirety.

The RMAC is preferably prepared in such a manner that the rubber is incorporated into the asphalt cement without any significant and/or substantial degradation and/or destruction of the base asphalt cement medium occurring. In one embodiment, for example, the rubber and asphalt cement are mixed without air blowing, oxidation, and/or or substantial distillation of the asphalt cement component. The asphalt cement and rubber, in this regard, can be stored in any suitable manner prior to mixing.

In one embodiment, the asphalt cement is stored in a vessel at a temperature of about 350° F., and whole tire rubber granules being stored in a separate vessel at ambient temperature. The asphalt cement medium is then pumped from the storage vessel through a pump and heat exchanger, where it increases in temperature to about 400-500° F., through a pipeline into a reactor vessel. If the temperature of the asphalt cement medium in the reactor vessel is substantially below 500° F., the asphalt cement medium may be recirculated through a pipeline, through a pump and heat exchanger, to raise the temperature to about 500° F. before being returned to the reactor vessel. The reactor vessel preferably has a top exit for removal of excess gaseous hydrocarbons and other gaseous vapors, such as $H_2S$, which are disposed of, for example, by incineration at a temperature of about 1350° F.

Whole tire rubber granules can be fed pneumatically from a storage vessel into the pipeline which carries the asphalt cement medium from the heat exchanger to the reactor vessel. The whole tire rubber granules mix with and become wetted by the heated asphalt cement medium in the pipeline before being discharged into the reactor vessel. When discharge of the complete batch of asphalt cement medium and whole tire rubber into the reactor vessel is complete and a temperature of 500° F. is achieved, circulation of the mixture in the reactor vessel is started. The mixture of asphalt cement and whole tire rubber is circulated from about the middle of the reactor vessel, through a pipeline and pump (such as a 450-600 gallon/minute pump), back into the reactor vessel through nozzles (such as dual port jet spray nozzles), and into the bottom of the reactor vessel. Circulation is continued at 500° F. until the whole tire rubber is completely integrated into the asphalt cement medium. In one embodiment, the temperature in the reactor vessel is maintained by use of a fire tube burner in the reactor vessel which maintains the temperature of the mixture in the reactor vessel so that circulation through the heat exchanger is not needed during the incorporation process. The finished product is pumped through a pipeline into a holding vessel before being blended, oxidized, polymer modified, or shipped as is.

In another embodiment, the asphalt cement and whole tire rubber are circulated at least in part through a heat exchanger.

In one embodiment, the dual port jet spray nozzles are two fixed jetting nozzles which face away from each other at an angle of 180° and which are each angled downwardly at 45° to promote mixing throughout the mixture in the reactor vessel. In a non-limiting example, the nozzles may each be formed from a 6" pipe in which the opening is tapered to a 1.5 inch opening. Using such an arrangement, intimate mixing of the whole tire rubber granules and the asphalt cement medium is achieved while simulating a boiling action in the liquid mixture in the reactor vessel. The jet spray nozzles provide a propulsion spray of the liquid mixture within the body of the liquid mixture in the reactor vessel which promotes turbulence, increases pressure and simulates a boiling action in the liquid mixture. Other arrangements of nozzles which achieve this effect may be used. While one embodiment includes two stationary nozzles, rotating nozzles or a different number or arrangement of nozzles may be used to achieve turbulence. The turbulence created allows the mixture to move upwardly through the reactor vessel. The incorporated product is lighter than the unincorporated or less incorporated mixture and tends to rise through the reactor vessel. Thus, when the mixture is pulled from about the middle of the reactor vessel for circulation through a pipeline and pump, the mixture circulated tends to be less incorporated than the mixture at the top of the reactor vessel, and during recirculation of this less incorporated mixture, is recirculated and the tire rubber granules are further softened in the turbulent environment and integrated into the asphalt cement medium until the samples obtained show a completely incorporated product.

The pump which generates the liquid flow through the nozzles may, in non-limiting example, be a 400 gallon per minute pump. The effect of the recirculation is to provide suction of the mixture from the middle portion of the reactor vessel and discharge of the mixture into the bottom portion of the reactor vessel.

The RMAC can comprise any desired amount of rubber. For example, the RMAC can comprise greater than about 5 wt. %, such as greater than about 8 wt. %, about 10 wt. %, about 12 wt. %, or even greater than about 14 wt. % of rubber, relative to the total weight of the RMAC, and/or have a rubber content in the range of about 5-15 wt. %, such as about 6-14 wt. %, about 7-13 wt. %, about 7.5-12.5 wt. %, about 8-12 wt. %, about 8.5-12.5 wt. %, or even about 9-11 wt. %, relative to the total weight of the RMAC, as well comprise one or more (including all) of the properties described in this section of the application (for example, rubber content, flash point, softening point, penetration, and/or solubility). In another embodiment, the RMAC can be more concentrated, i.e., having one or more properties (for example, rubber content, flash point, softening point, penetration, and/or solubility) different and/or higher than those desired for the subsequent pre-treatment and/or emulsification steps. For example, the RMAC can comprise greater than about 16 wt. %, about 18 wt. %, about 20 wt. %, about 25 wt. %, about 30 wt. %, or even greater than about 35 wt. % of rubber (relative to the total weight of the RMAC), and/or have a rubber content in the range of about 16-35 wt. %, about 18-30 wt. %, about 20-35 wt. %, or about 20-30 wt. %, relative to the total weight of the RMAC. In this regard, in the event that the RMAC has one or more properties (for example, rubber content, flash point, softening point, penetration, and/or solubility) that are higher than the desired properties for the subsequent pre-treatment and/or emulsification steps, the RMAC can be modified prior to these subsequent steps, such as by blending the RMAC with asphalt. In one embodiment, for example, a RMAC concentrate having greater than about 30 wt. % of rubber, relative to the total weight of the RMAC, is blended (prior to the pre-treatment and emulsification steps) with additional asphalt in a manner such that the RMAC comprises about 5-15 wt. % of rubber, relative to the total weight of the RMAC, as well as one or more (including all) of the properties described in this section of the application (for example, rubber content, flash point, softening point, penetration, and/or solubility).

In one embodiment, the rubber within the RMAC has an average size of less than about 20 microns, such as less than about 18 microns, about 16 microns, about 14 microns, about 12 microns, about 11 microns, about 10 microns, about 9 microns, about 8 microns, about 7 microns, about 6 microns, about 5 microns, about 4 microns, about 3 microns, about 2 microns, about 1 micron, about 0.75 micron, about 0.5 micron, or even less than about 0.1 micron.

In another embodiment, greater than about 1% (such as greater than about 3%, about 5%, about 10%, about 15%, or even greater than about 10% by weight) of the rubber in the RMAC has an average size of about 0.1-20 (such as about 1-15, about 5-15, about 5-20, about 10-20, or even about 10-15) microns, with the remainder of the rubber having an average particle size of less than about 10 (such as less than about 8, about 6, or even less than about 4) microns. In another embodiment, the RMAC comprises less than about 8 wt. % (such as less than about 6 wt. %, less than about 5 wt. %, less than about 4 wt. %, less than about 3 wt. %, less than about 2 wt. %, less than about 1 wt. %, less than about 0.5 wt. %, less than about 0.25 wt. %, substantially no, or even no) rubber that is in a solid state.

In one preferred embodiment, the RMAC exhibits a solubility in trichloroethylene (as determined via ASTM D2042) of at least about 90% (such as at least about 92%, at least about 94%, at least about 95%, at least about 96%, at least about 97%, at least about 98%, or even at least about 99%). For example, it is preferred, in one embodiment, that when about 3 grams of the RMAC is dissolved in about 100 mL of trichloroethylene and filtered through a 150 mm No. 52 filter paper, less than about 10 wt. % (such as less than about 8 wt. %, about 6 wt. %, about 5 wt. %, about 4 wt. %, about 3 wt. %, about 2 wt. %, or even less than about 1 wt. %) of the RMAC remains on the filter paper following such filtering. Preferably, the RMAC also exhibits a softening point (as determined via ASTM D36) greater than about 90° F., such as greater than about 100° F., or even greater than about 110° F.—a point at which, for example, a weight (such as a steel ball having a diameter of about 9.5 mm and a mass of about 3.50±0.05 g) penetrates or settles at least about 1 inch into a sample of the RMAC, using a ring and ball softening point apparatus. In one preferred embodiment, the RMAC has a softening point of about 115-125° F.

Alternatively, or in addition, the RMAC comprises a penetration at 77° F. (as determined via ASTM D5) of less than about 60 dmm, such as less than about 50 dmm, about 40 dmm, about 30 dmm, about 20 dmm, or even less than about 10 dmm (such as about 5-50 dmm, about 10-40 dmm, about 15-35 dmm, or even about 15-30 dmm), at which, for example, a 1 mm-diameter needle penetrates into the RMAC at a needle load of about 100 grams for a duration of about 5 seconds. Alternatively, or in addition, the RMAC comprises a flash point (as determined via ASTM D 93) of at least about 460° F., such as at least about 480° F., at least about 500° F., at least about 510° F., at least about 520° F., at least about 530° F., at least about 540° F., or even at least about 550° F.

In one embodiment, the RMAC is an asphalt cement concentrate having the following properties:

```
Content Derived from Recycled Tire Rubber = 18-25%
Solubility in Trichloroethylene (ASTM D2042) = 97.5% (min)
Penetration @ 25° C. (ASTM D 5) = 60-90 dmm
Absolute Viscosity @ 60° C. (ASTM D2171) = 1000-1600
Flash Point - Cleveland Open Cup (ASTM D 92) = 450 F. (min)
Softening Point (ASTM D36) = 110-120 F.
```

In one embodiment, the RMAC comprises about 9-13 wt. % of rubber (relative to the total weight of the RMAC), a penetration at 77° F. (as determined via American Society for Testing and Materials (ASTM) D5) of about 18-22 dmm, a softening point (as determined via ASTM D36) greater than about 112° F., and a solubility in trichloroethylene (as determined via ASTM D2042) of at least about 98%.

In some embodiments, in addition to the rubber and asphalt cement components, other additives that enhance, cause, and/or assist in devulcanization, liquefaction, and/or break-down of the rubber are combined, mixed, contacted, and/or blended with the rubber and/or asphalt cement components prior to and/or during contact of the rubber and asphalt cement in preparing the RMAC. For example, such other additives can aid in incorporation and/or combination of the rubber into the asphalt cement, and/or to adjust or alter the physical properties (e.g., softening point, hardness, stability) of the RMAC. For example, any anti-foam agents, polymer latex, and/or sulfonic acids (e.g., DBSA and/or p-TSA) can be used in preparing the RMAC, such as described in U.S. Pat. No. 5,496,400 (Doyle), U.S. Pat. No. 7,087,665 (Sylvester), U.S. Pat. App. No. 2005/0131113, filed Feb. 7, 2005 (Sylvester), and/or U.S. Pat. App. No. 2007/2049762, filed Jul. 10, 2006 (Sylvester). In some preferred embodiments, however, no such other additives are used in preparing the RMAC.

Pre-Treatment of RMAC

Following preparation of the RMAC, and before emulsification of the RMAC within an aqueous solution, the RMAC is preferably pre-treated with one or more emulsifiers in a chemical pre-treatment and/or modification step. Any suitable amount of one or more emulsifiers can be combined, mixed, contacted, and/or blended with the RMAC. In one embodiment, about 0.1-10 wt. % (such as about 0.5-8 wt. %, or even about 1-5 wt. %) of emulsifier is combined, mixed, contacted, and/or blended with 90-99.9 wt. % (such as about 92-99.5 wt. %, or even about 95-99 wt. %) of RMAC, relative to the total weight of the pre-treated RMAC.

The emulsifier can be any suitable emulsifier that increases the ease with which the RMAC forms an emulsion in a subsequent emulsification step, such as in an emulsification solution (such as an aqueous emulsification solution, for example in the form of a water and clay solution or slurry that lacks any emulsifiers) and/or decreases the tackiness and/or enhances other desired properties of such an emulsified RMAC product. In one embodiment, for example, the emulsifier comprises at least about 20 wt. % (such as at least about 20 wt. %, about 30 wt. %, about 40 wt. %, about 50 wt. %, about 60 wt. %, about 70 wt. %, about 80 wt. %, or even at least about 90 wt. %) of an amine compound, such as a diamine compound, or any compound having two or more amine groups (such as a compound having two or more amine groups that is highly salted and/or any other desirable or effective diamine (such as simple diamine that is highly salted, and optionally one or more of a further amine compound (e.g., a monoamine compound, such as an amine oxyalkylate compound), one or more aromatic hydrocarbon compounds, a carboxylic acid compound, and/or a tall oil compound or derivative. In one preferred embodiment, the emulsifier comprises about 20-60 wt. % of the diamine compound and about 10-50 wt. % of the further amine compound. In another preferred embodiment, the emulsifier comprises (i) about 30-50 wt. % of a diamine compound; (ii) about 20-40 wt. % of an amine oxyalkylate compound; (iii) about 15-25 wt. % of a carboxylic acid compound; (iv) about 5-10 wt. % of one or more aromatic hydrocarbon compounds; and (v) about 5-10 wt. % of a tall oil compound. In another preferred embodiment, the emulsifier is CORSAPAVE 5159™, available from Corsicana Technologies (Corsicana, Tex.).

Any suitable method can be used for combining, mixing, contacting, and/or blending the one or more emulsifiers with RMAC. In one embodiment, the emulsifier(s) is combined with the RMAC at a temperature of about 300-400° F. (such as about 325-375° F., or even about 325-350° F.). Any suitable mechanical means can be used to combine, mix, contact, and/or blend the emulsifier(s) with the RMAC, such as, for example, a reactor vessel or simple mixer. In one embodiment, for example, the emulsifier(s) is combined with the RMAC in a mixer at a temperature of about 300-400° F. (such as about 325-375° F., or 325-350° F.) until a desired level of combining, mixing, contacting, and/or blending is achieved. In another embodiment, the blending or mixing process is achieved through use of a pump or tank circulation system, such as a system having a blade mixer or air- or nitrogen-based tank agitation vessel. In another embodiment, blending is accomplished through use of an in-line blender that comprises a circulation line, an injection line for feeding the chemical, and a static in-line mixer.

In one embodiment, the pre-treated RMAC comprises a softening point that is lower than the softening point of the RMAC prior to pretreatment. In this manner, pre-treatment of the RMAC allows for the preparation of an enhanced (such as readily-emulsifiable, readily-stored, and/or high and/or enhanced stability) RMAC, as compared to RMAC that is not pre-treated; an enhanced RMAC emulsion, as compared to an emulsion of RMAC that is not pre-treated; and/or ultimately an enhanced cured coating formed by an RMAC emulsion that is curable (such as a cured coating having a reduced and/or low softening point), as compared to a cured coating formed by a conventional RMAC emulsion. In one embodiment, for example, pre-treatment of the RMAC decreases and/or reduces the softening point of the RMAC by at least 0.5%, such as by at least about 1%, about 2%, about 3%, about 4%, about 5%, about 6%, about 7%, about 8%, about 9%, or even by at least about 10%, as compared to a RMAC that is not pre-treated. In another preferred embodiment, the pre-treated RMAC comprises a softening point of about 110-120° F. Alternatively, or in addition, the pre-treated RMAC can be stably stored (such as without any significant or substantial degradation and/or settling) at a temperature of less than about 400° F. (such as less than about 375° F., about 350° F., about 325° F., about 300° F., about 275° F., about 250° F., about 225° F., about 200° F., or even less than about 150° F., such as at a temperature of about 200-400° F., or about 300-375° F., or even 325-350° F.) for a duration of greater than 6 hours (such as greater than about 12 hours, about 18 hours, about 1 day, about 2 days, about 3 days, about 5 days, about 1 week, about 2 weeks, about 3 weeks, about 1 month, about 2 months, or even about 3 months).

In some embodiments, in addition to the emulsifier(s) used in the pre-treatment process and the RMAC, the pre-treatment mixture further comprises one or more optional additives, such as, for example, one or more anti-foam agents, one or more thickeners, polymer latex, and/or water. In other embodiments, the pre-treatment mixture of RMAC and emulsifier(s) does not contain any other additives (such as water).

Preparation of Emulsification Solution

The emulsification solution (with which the pre-treated RMAC forms a pre-treated RMAC emulsion) can be any suitable aqueous solution comprising water and optionally a clay. In one preferred embodiment, for example, the emulsification solution comprises water and a clay (such as sepiolite clay or sea mud). In another embodiment, the emulsification solution comprises water, clay, and no other additives or components.

The emulsification solution can comprise any suitable clay, such as any partially hydrophobic clay, any substantially hydrophobic clay, and/or any fully hydrophobic clay. Alternatively, or in addition, the emulsification solution can comprise any clay that comprises non-spherical, irregularly-shaped, and/or elongated particles. In one preferred embodiment, for example, the clay is a clay that is stable and/or resistant to breakdown when contacted with water and/or does not swell and/or undergo shape change when contacted with water. Moreover, the clay can be any fibrous clay (such as a fibrous clay mineral of palygorskite type), non-bentonite clay, and/or any clay having a Loss on Ignition (LOI) at 100° C. of about 10-20 (such as about 12-18, or even about 14-17); a boiling point greater than about 800° F. (preferably, greater than about 900° F., or even greater than about 1000° F.); and/or a specific gravity of about 1.0-3.5. Alternatively, or in addition, the clay can comprise one or more of: less than about 70 wt. % of silicon (such as less than about 68 wt. %, about 66 wt. %, about 64 wt. %, about 62 wt. %, about 60 wt. %, about 58 wt. %, or even less than about 56 wt. %); less than about 10 wt. % of aluminum (such as less than about 8 wt. %, about 7 wt. %, about 6 wt. %, or even less than about 5 wt. %); greater than about 10 wt. % of magnesium (such as greater than about 12 wt. %, about 14 wt. %, about 16 wt. %, or even greater than about 18 wt. %); less than about 3 wt. % of iron (such as less than about 2.5 wt. %, about 2.0 wt. %, or even less than about 1.5 wt. %); about 0.1-3 wt. % of calcium (such as about 0.25-2.0 wt. %, about 0.25-1.0 wt. %, or even less than about 3 wt. %, less than about 2 wt. %, or even less than about 1 wt. %); less than about 5 wt. % of sodium (such as less than about 4 wt. %, less than about 3 wt. %, less than about 2.5 wt. %, less than about 2 wt. %, or even less than about 1.5 wt. %); and/or about 0.1-5 wt. % of potassium (such as about 0.5-4.0 wt. %, about 0.5-3.0 wt. %, about 0.5-2.0 wt. %, or even less than about 5 wt. %, less than about 4 wt. %, less than about 3 wt. %, less than about 2 wt. %, or even less than about 1.5 wt. %). In one preferred embodiment, the emulsification solution comprises a clay that comprises: (i) about 0.1-60 wt. % of silicon; (ii) about 0.1-10.0 wt. % of aluminum; (iii) greater than about 10 wt. % of magnesium; (iv) about 0.1-3.0 wt. % of iron; (v) about 0.1-3.0 wt. % of calcium; and (vi) less than about 2 wt. % of sodium; and (vii) less than about 5 wt. % of potassium. In another preferred embodiment, the emulsification solution comprises sepiolite clay or sea mud. In yet another preferred embodiment, the emulsification solution is an aqueous solution or slurry (such as a blended slurry or single-phase slurry) comprising softened water at 120-140° F. and a clay compound (such as a sepiolite clay compound).

Any suitable concentration of clay can be added to the emulsification solution, such that, for example, when the emulsification solution is combined, mixed, contacted, and/or blended with the pre-treated RMAC to form a pre-treated RMAC emulsion, the emulsion comprises a clay concentration of less than about 10 wt. %, such as less than about 9 wt. %, about 8 wt. %, about 7 wt. %, about 6 wt. %, about 5 wt. %, about 4 wt. %, about 3 wt. %, about 2 wt. %, or even less than about 1 wt. % (such as, for example, about 0.1-10 wt. %, about 0.5-8 wt. %, about 1-7 wt. %, about 1-6 wt. %, about 1-5 wt. %, or even about 1-4 wt. %), relative to the total weight of the pre-treated RMAC emulsion. Any of the clay-containing emulsification solutions can be prepared in any suitable manner, such as by combining, mixing, contacting, and/or blending water and clay at a temperature of about 80-180° F., such as about 90-150° F., about 100-140° F., or even about 110-130° F.

In some embodiments, in addition to water and clay, the emulsification solution comprises any suitable other additives, such as other thickeners, polymer latex, surfactants, and/or anti-foam agents.

In some embodiments, for example, in addition to water and clay, the emulsification solution comprises any suitable other thickener(s), including but not limited to associative thickeners, polyurethanes, nonionic surfactants, alkali swellable latex thickeners, cellulose, cellulose derivatives, modified cellulose products, plant and vegetable gums, starches, alkyl amines, polyacrylic resins, carboxyvinyl resins, polyethylene maleicanhydrides, polysaccharides, acryliccopolymers, hydrated lime (such as cationic and/or nonionic lime), and/or any other thickener known in the art.

In some embodiments, for example, in addition to water and clay, the emulsification solution further comprises polymer latex. Polymer latex may be included, in some embodiments, to enhance adhesion, water resistance, and/or other desired physical properties of the pre-treated RMAC emulsion. Such polymer latex can comprise a rubber or elastomeric latex in which globules of rubber or elastomer are suspended in an aqueous medium, such as, for example, styrene-butadiene rubber latex ("SBR latex"), neoprene and/or natural rubber, acrylics, vinylacrylics, acrylic terpolymers, nitrite, polyvinyl alcohol, polyvinyl acetate, vinyl acetate-ethylene, vinyl ester copolymers, ethylene vinyl chloride, polyvinylidene chloride, butyl rubber, acrylonitrile-butadiene, polyurethanes, silicones, block copolymers such as styrene-isoprene (SIS), styrene-ethylene-vinyl acetate (SEVAS), styrene acrylate, and combinations and mixtures thereof.

In some embodiments, for example, in addition to water and clay, the emulsification solution further comprises one or more surfactants, such as, for example, any non-ionic, cationic, and/or anionic surfactant, such as any surfactant that includes dodecyl benzenesulfonic acid, any non-ionic surfactant that includes ethylhexanol, or any combination or mixture thereof.

In some embodiments, for example, in addition to water and clay, the emulsification solution further comprise an anti-foam agent, such as, for example, Dow Anti-Foam 1400® (available from Dow Chemical Company, Midland, Mich.), Dow Anti-Foam Component A® (available from Dow Chemical Company, Midland, Mich.), Surfynol 104A® (available from Air Products Corporation) may be added to the emulsification solution or may be post added to the pre-treated RMAC emulsion. The emulsification solution, in this regard, can comprise any suitable concentration of one or more anti-foam agents, such as, for example, about 0.0025-0.05 wt. % of an anti-foam agent.

Emulsion of Pre-Treated RMAC

The pre-treated RMAC can be emulsified in any suitable manner by combining, mixing, contacting, and/or blending any desired amount of the pre-treated RMAC with any corresponding amount of the emulsification solution, to produce a pre-treated RMAC emulsion having any desired properties. In one preferred embodiment, the pre-treated RMAC emulsion is prepared such that it comprises less than about 55 wt. %, such as less than about 50 wt. %, about 48 wt. %, about 45 wt. %, about 35 wt. %, about 30 wt. %, about 25 wt. %, about 20 wt. %, about 15 wt. %, or even less than about 10 wt. %, such as about 10-55 wt. %, about 10-50 wt. %, about 10-48 wt. %, about 10-45 wt. %, about 10-40 wt. % about 15-40 wt. %, about 20-40 wt. %, about 25-40 wt. %, about 15-35 wt. %, about 20-35 wt. %, about 10-30 wt. %, about 15-30 wt. %, or even about 20-30 wt. %) of solids (pre-treated RMAC and clay), relative to the total weight of the pre-treated RMAC emulsion. Alternatively, or in addition, the pre-treated RMAC emulsion comprises about 0.01-25 wt. % (such as about 0.1-20 wt. %, about 0.1-15 wt. %, about 0.1-10 wt. %, about 0.1-8 wt. %, about 0.1-6 wt. %, about 0.14 wt. %, about 0.5-3 wt. %, about 0.5-2 wt. %, or even less than about 20 wt. %, less than about 15 wt. %, less than about 10 wt. %, less than about 5 wt. %, less than about 4 wt. %, less than about 3 wt. %, less than about 2 wt. %, or even less than about 1 wt. %) of rubber, relative to the total weight of the pre-treated RMAC emulsion. Alternatively, or in addition, the pre-treated RMAC emulsion comprises about less than about 6 wt. %, about 4 wt. %, about 2 wt. %, such as less than about 1.5 wt. %, about 1.0 wt. %, about 0.8 wt. %, about 0.6 wt. %, about 0.4 wt. %, about 0.2 wt. %, or even less than about 0.1 wt. % (such as about 0.01-1.0 wt. %, about 0.1-1.0 wt. %, or even about 0.1-0.8 wt. %) of the pre-treatment emulsifier, relative to the total weight of the pre-treated RMAC emulsion.

The pre-treated RMAC emulsion can have any suitable viscosity. In some embodiments, the emulsion has a viscosity of about 20-80 Krebs Units (KU), such as about 25-75 KU, about 30-70 KU, or even about 35-65 KU, such as a converted viscosity from the Kreb Unit tester of about 50-500 cP, about 75-450 cP, or even about 100-400 cP. In other embodiments, when a high concentration emulsion (such as having a high concentration of RMAC) is desired, the emulsion can have a viscosity of about 25-200 KU, about 25-190 KU, about 30-180 KU, about 35-170, or even about 40-160 KU. In some embodiments, the pre-treated RMAC emulsion has a viscosity that is at least partially temperature insensitive and/or viscosity-stabilized. In some embodiments, for example, the emulsion can have no appreciable change in viscosity (such as less than about a 20%, about 15%, about 10%, about 5, or even less than about a 1% change in viscosity) in the temperature ranges of about 60-100° F., about 60-120° F., about 60-140° F., or even about 40-140° F., unlike conventional RMAC emulsions which may require on-site heating in order to achieve desired viscosity.

Alternatively, or in addition, the pre-treated RMAC emulsion comprises a specific gravity (as determined via ASTM D 2939.07) less than about 2.0, such as less than about 1.5, about 1.4, about 1.3, about 1.2, about 1.1, about 1.0, about 0.8, or even less than about 0.6. Alternatively, or in addition, less than about 1 wt. % (such as less than about 0.8 wt. %, about 0.6 wt. %, about 0.4 wt. %, about 0.2 wt. %, about 0.1 wt. %, about 0.05 wt. %, or even less than about 0.01 wt. %) of the pre-treated RMAC emulsion, relative to the total weight of the pre-treated RMAC emulsion, remains on a 850-um mesh sieve following contact of the sieve with the pre-treated RMAC emulsion during the Sieve Emulsion Test in accordance with ASTM D 6933-04, such as when contacting the emulsion and sieve at an emulsion temperature of about room temperature. Alternatively, or in addition, greater than about 20 wt. % (such as greater than about 25 wt. %, about 30 wt. %, about 35 wt. %, or even greater than about 48 wt. %) of the pre-treated RMAC emulsion remains after heating the emulsion during the Residue By Evaporation Test in accordance with ASTM D 2939.08, such as to a temperature of about 221±4° F. for a duration until successive hourly weighing shows loss of 0.05 or less of the emulsion (such as for about 4 hours). Alternatively, or in addition, less than about 80 wt. % (such as less than about 75 wt. %, about 70 wt. %, about 65 wt. %, or even less than about 52 wt. %) loss of the emulsion occurs when the emulsion is heated during the Residue By Evaporation Test, such as to a temperature of about 221±4° F. for a duration until successive hourly weighing shows loss of 0.05 or less of the emulsion (such as for about 4 hours).

The pre-treated RMAC can be emulsified in any suitable manner by combining, mixing, contacting, and/or blending the pre-treated RMAC with the emulsification solution. In one preferred embodiment, the pre-treated RMAC is heated and/or maintained at a temperature of about 310-375° F. (such as about 310-350° F.), and is combined, mixed, contacted, and/or blended with an emulsification solution that has been heated and/or maintained at a temperature of about 70-130° F., such as about 75-125° F., about 80-120° F., about 85-115° F., or even about 90-110. Any suitable method can be employed for combining, mixing, contacting, and/or blending the pre-treated RMAC and emulsification solution, such as, for example, milling. In one preferred embodiment, the pre-treated RMAC and emulsification solution are combined in such a manner that at least a portion (e.g., substantially all) of the pre-treated RMAC is sheared (such as into droplets) and forms a pre-treated RMAC emulsion, such as through use of a batch Cowel's mixer and/or an in-line high shear mill.

In some embodiments, the emulsification process involves a dual-step process. Specifically, for example, the emulsification solution (at about 80-120° F.) can be placed in a high speed dispersion vessel that is equipped with a mixer, such as a rotor-stator type blade type mixer or a Cowel's mixer. The pre-treated RMAC (at a temperature of about 310-375° F.) is then added to the emulsification solution, and the mixer is used to pre-disperse the pre-treated RMAC throughout the emulsification solution. A first line fluidly connects the dispersion vessel to the input end of a colloid mill, and a second line fluidly connects the output end of the colloid mill to the dispersion vessel. The pre-treated RMAC/emulsification solution mixture is thus recirculated from the dispersion vessel, through a line, through the colloid mill, and back into the dispersion vessel. The positive displacement of the colloid mill serves to propel the mixture through this recirculation path. The mixer and the colloid mill can continue to run, and recirculation of the mixture can be continued, until the pre-treated RMAC emulsion has reached the desired consistency (e.g., when the size of the pre-treated RMAC droplets in the emulsion are about 2-20 microns in diameter, such as less than about 20 microns, less than about 18 microns, about 16 microns, about 14 microns, about 12 microns, about 10 microns, about 8 microns, about 6 microns, about 4 microns, or even less than about 2 microns).

In another embodiment, a single step emulsification process may be used wherein the pre-treated RMAC at a temperature of about 310-375° F. and the emulsification solution at a temperature of about 80-120° F. are co-milled in a single pass through a colloid mill. One commercially available colloid mill useable for this process is the Dalworth MP-10, available from DALWORTH Machine Products (Fort Worth, Tex.). Another commercially available colloid mill useable for this process is the Charlotte G-75, available from Chemicolloid Laboratories, Inc. (Garden City Park, N.Y.).

In another embodiment, the emulsification solution (such as at a temperature of about 80-120° F.) may be placed in a high speed dispersion vessel that is equipped with a mixer having a tip speed of at least 5000 rpm (such as at least 6000 rpm, at least 7000 rpm, or even at least 8000 rpm) (such as a Cowel's type mixer). The pre-treated RMAC (such as at a temperature of about 310-375° F.) is then added to the emulsification solution (such as via a fluid input line), and the mixer is used to pre-disperse the pre-treated RMAC throughout the emulsification solution. The pre-treated RMAC is high sheared at the blade tips of the rotating Cowel's mixer, providing the desired dispersion within the solution. The pre-treated RMAC feed is continued until the desired solid content is achieved. The combined components will continue to shear with the rotating mixer blade for an additional time to ensure that efficient particle distribution is achieved (e.g., wherein the average size of the pre-treated RMAC droplets in the emulsion are about 2-20 microns in diameter, such as less than about 20 microns, less than about 18 microns, about 16 microns, about 14 microns, about 12 microns, about 10 microns, about 8 microns, about 6 microns, about 4 microns, or even less than about 2 microns).

When contacted with a desired application site, the pre-treated RMAC emulsion cures to form a cured coating or residue which can be used for any suitable purpose. In some embodiments, for example, the cured coating is applied to any paved surface, such as any roadway, driving surface, and/or paved surface (such as to form a seal-coat and/or surface sealer) in any suitable manner (such as by computer rate control asphalt spreader truckers, hand spray wands, and/or by squeegees). In other embodiments, the cured coating of the pre-treated RMAC emulsion is applied to any industrial surface (such as to enhance corrosion resistance of steel, concrete, or the like, and/or to improve fire resistance of such surfaces), any building surface such as any roof surface (such as to form a seal-coat and/or surface sealer for the surface, such as proximate to any asphalt roof surface such as asphalt roof shingles), and/or the like, in any suitable manner. In this regard, the cured coating can form any suitable industrial coating composition, surface sealer composition, roof sealer composition, and/or roofing asphalt cement, or the like.

The cured coating can have any desired properties, such as high and/or enhanced resistance to water, fuel, and/or UV, as compared to cured coatings prepared from RMACs that are not pre-treated. In one preferred embodiment, the cured coating comprises and/or exhibits no tackiness, low tackiness, and/or substantially no tackiness properties. In another preferred embodiment, the cured coating comprises a softening point (as determined via ASTM D 36) greater than about 310° F., such as greater than about 320° F., about 330° F., about 340° F., about 350° F., about 360° F., about 370° F., or even greater than about 380° F.—a point at which, for example, a weight (such as a steel ball having a diameter of about 9.5 mm and a mass of about 3.50±0.05 g) penetrates or settles at least about 1 inch into a sample of the cured coating, using a ring and ball softening point apparatus. Alternatively, or in addition, less than 10 wt. % (such as less than about 9 wt. %, about 8 wt. %, about 7 wt. %, about 6 wt. %, about 5 wt. %, about 4 wt. %, about 3 wt. %, about 2 wt. %, about 1 wt. %, about 0.5 wt. %, or even less than about 0.1 wt. %) loss of the cured coating occurs, during the Wet Track Abrasion Test, when the cured coating is surface scrubbed after being submerged in water for five days in accordance with International Slurry Surfacing Association (ISSA) TB-100, relative to the total weight of the cured coating. Alternatively, or in addition, substantially no cured coating sags and/or slips after exposure for about 2 hours at 212° F.±9° F. in accordance with a Resistance to Heat Test in accordance with ASTM D 2939.14. Alternatively, or in addition, substantially no blistering and/or re-emulsification of the cured coating occurs after submersion for greater than about 8 hours (such as about 12 hours, about 18 hours, about 1 day, about 2 days, or even greater than about 3 days) in water having a temperature of about 75° F.±5° F., in accordance with a Resistance to Water Test in accordance with ASTM D 2939.15. Alternatively, or in addition, less than about 10% (such as less than about 5% or less than about 1%) of the cured coating flows beyond an initial reference line when subjected to the Wet Flow Test in accordance with ASTM D 2939.19, such as when subjecting the cured coating for about 30 minutes to a temperature of about 73.0° F.±4.0° F. and a relative humidity of about 50±2%. Alternatively, or in addition, no continued combustion, slippage, and/or run-down of the cured coating occurs during a Direct Flame Test in accordance with ASTM D 2939.20, such as when a blue flame (such as from a Bunsen burner) is applied for about 10 seconds to a portion of a cured coating sample. Alternatively, or in addition, minimal, low, and/or substantially no, and/or no cracking, chipping, surface distortion, color fading, lightening, and/or loss of adhesion of the cured coating occurs when the cured coating is contacted with and/or applied to a ceramic tile [such as a ceramic tile prepared in accordance with ASTM D 2939-25.1, such as an unglazed ceramic tile having a white, nonvitreous, dust-pressed body with an absorption range of 10-18%, determined in accordance with Test Methods C 67, approximately 150 mm by 150 mm by 9.5-14 mm (thickness)] and exposed to ultraviolet light and condensation in accordance with the Accelerated Weathering Test (as defined by ASTM G 154), such as for an exposure period of about 1000 hours that includes about 8 hours of exposure to UV light (such as a UVA-340 lamp, 0-0.77 W/m2; v.1.0 calibration) at about 50° C., and about 3.55 hours of exposure to condensation at 50° C.

All publications and patent applications mentioned in this specification are herein incorporated by reference to the same extent as if each individual publication or patent application was specifically and individually indicated to be incorporated by reference.

It will be apparent to one of ordinary skill in the art that many changes and modification can be made to the disclosures presented herein without departing from the spirit or scope of the appended claims.

What is claimed is:

1. A method for preparing an asphalt cement emulsion, comprising:
    a) preparing a pre-treatment mixture comprising:
        i) a rubber-modified asphalt cement; and
        ii) one or more emulsifiers, comprising a diamine compound; and
    b) mixing the pre-treatment mixture with an emulsification solution comprising:
        water and clay.

2. The method of claim 1, wherein the asphalt cement emulsion comprises from about 0.01 to 25 wt. % of the rubber-modified asphalt cement.

3. The method of claim 1, wherein the clay is a hydrophobic clay.

4. The method of claim 1, wherein the clay is sepiolite clay.

5. The method of claim 1, wherein the one or more emulsifiers comprises:
    i) from about 30 to 50 wt. % of the diamine compound;
    ii) from about 20 to 40 wt. % of an amine oxyalkylate compound;
    iii) from about 15 to 25 wt. % of a carboxylic acid compound;
    iv) from about 5 to 10 wt. % of one or more aromatic hydrocarbon compounds; and
    v) from about 5 to 10 wt. % of a tall oil compound.

6. The method of claim 1, wherein the pre-treatment mixture is readily-emulsifiable.

7. The method of claim 1, wherein less than about 0.5 wt. % of the emulsion, relative to the total weight of the emulsion, remains on a 850-um mesh sieve following contact of the sieve with the emulsion during the Sieve Emulsion Test.

8. The method of claim 1, wherein the emulsion is curable to form a cured coating having a softening point of greater than about 350° F.

9. The method of claim 8, wherein less than 5 wt. % loss of the cured coating occurs during the Wet Track Abrasion Test, relative to the total weight of the cured coating.

10. A method for coating an industrial surface, comprising contacting the surface with an asphalt cement emulsion comprising a mixture of:
   a) a pre-treatment mixture comprising:
      i) a rubber-modified asphalt cement; and
      ii) one or more emulsifiers, comprising a diamine compound; and
   b) an emulsification solution comprising clay and water.

11. The method of claim 10, wherein the industrial surface is steel or concrete.

12. The method of claim 10, wherein the one or more emulsifiers comprises:
   i) about 30 to 50 wt. % of the diamine compound;
   ii) about 20 to 40 wt. % of an amine oxyalkylate compound;
   iii) about 15 to 25 wt. % of a carboxylic acid compound;
   iv) about 5 to 10 wt. % of one or more aromatic hydrocarbon compounds; and
   v) about 5 to 10 wt% of a tall oil compound.

13. The method of claim 10, wherein the emulsion is curable to form a cured coating having a softening point of greater than about 350° F.

14. An asphalt cement emulsion comprising:
   a) a pre-treatment mixture comprising:
      i) a rubber-modified asphalt cement; and
      ii) one or more emulsifiers, comprising a diamine compound; and
   b) an emulsification solution comprising:
      i) one or more emulsifiers;
      ii) optionally a thickener, an anti-foam agent, a polymer latex, and/or surfactant; and
      iii) a clay and water.

15. The emulsion of claim 14, wherein the asphalt cement emulsion comprises about 0.01-25 wt. % of the rubber-modified asphalt cement.

16. The emulsion of claim 14, wherein the clay is a hydrophobic clay.

17. The emulsion of claim 14, wherein the one or more emulsifiers comprises:
   i) about 30 to 50 wt. % of the diamine compound;
   ii) about 20 to 40 wt. % of an amine oxyalkylate compound;
   iii) about 15 to 25 wt. % of a carboxylic acid compound;
   iv) about 5 to 10 wt. % of one or more aromatic hydrocarbon compounds; and
   v) about 5 to 10 wt. % of a tall oil compound.

* * * * *